United States Patent
Sugai

(10) Patent No.: US 10,415,716 B2
(45) Date of Patent: Sep. 17, 2019

(54) CONTROL VALVE UNIT

(71) Applicant: Honda Motor Co., Ltd., Tokyo (JP)

(72) Inventor: Satoshi Sugai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/716,368

(22) Filed: Sep. 26, 2017

(65) Prior Publication Data

US 2018/0100600 A1 Apr. 12, 2018

(30) Foreign Application Priority Data

Oct. 11, 2016 (JP) .................................. 2016-200247

(51) Int. Cl.
| | |
|---|---|
| *F16K 31/00* | (2006.01) |
| *F16K 27/02* | (2006.01) |
| *F16K 15/04* | (2006.01) |
| F16H 57/04 | (2010.01) |
| F16H 61/02 | (2006.01) |
| F16H 57/035 | (2012.01) |

(52) U.S. Cl.
CPC .......... *F16K 27/0245* (2013.01); *F16K 15/04* (2013.01); *F16K 27/0209* (2013.01); *F16H 57/035* (2013.01); *F16H 57/0435* (2013.01); *F16H 2061/0279* (2013.01)

(58) Field of Classification Search
CPC .. F16K 27/0245; F16K 15/04; F16K 27/0209; F16H 57/0435
USPC ....... 137/513.5, 513.7, 515.5, 515.7, 516.11, 137/533.11, 533.15, 599.11, 601.2
See application file for complete search history.

(56) References Cited

U.S. PATENT DOCUMENTS

| | | | | | |
|---|---|---|---|---|---|
| 2,018,769 | A | * | 10/1935 | Tryon | .................... F16K 15/04 137/515.7 |
| 2,390,749 | A | * | 12/1945 | Swift | ........................ F16T 1/38 137/192 |
| 3,346,008 | A | * | 10/1967 | Scaramucci | ............ F16K 15/04 137/515.7 |
| 3,638,626 | A | * | 2/1972 | Marshall | ................. F02P 5/103 123/406.69 |
| 4,064,896 | A | * | 12/1977 | Trenary | ................... F16K 15/04 137/218 |
| 4,286,622 | A | * | 9/1981 | Ninomiya | ................ F16K 15/04 137/516.29 |
| 4,474,208 | A | * | 10/1984 | Looney | ............... F16K 17/0406 137/516.29 |
| 4,781,213 | A | * | 11/1988 | Kilayko | ................... F16K 1/465 137/516.27 |

(Continued)

FOREIGN PATENT DOCUMENTS

| | | |
|---|---|---|
| JP | 63-094348 U | 6/1988 |
| WO | 2010113716 A1 | 10/2010 |

*Primary Examiner* — Reinaldo Sanchez-Medina
(74) *Attorney, Agent, or Firm* — Duft & Bornsen, PC

(57) ABSTRACT

A control valve unit including a pair of valve bodies, a separator plate interposed between the pair of valve bodies and provided with an opening, a collar attached to the separator plate through the opening and having a valve port and a valve seat, a check ball separating from the valve seat and seating on the valve seat by hydraulic pressure to open and close the valve port, and a combining part combining the pair of valve bodies to sandwich the collar between an end surface of one of the pair of valve bodies and an end surface of the separator plate.

7 Claims, 2 Drawing Sheets

(56) References Cited

U.S. PATENT DOCUMENTS

| | | | | |
|---|---|---|---|---|
| 5,143,258 | A * | 9/1992 | Mittermaier | B67D 7/36 |
| | | | | 137/110 |
| 5,819,792 | A * | 10/1998 | Reynolds | F04B 43/0733 |
| | | | | 137/515.7 |
| 5,950,670 | A * | 9/1999 | Flaim | B25B 11/005 |
| | | | | 137/493.8 |
| 8,651,188 | B2 * | 2/2014 | Scarsdale | E21B 43/123 |
| | | | | 137/516.29 |
| 8,671,971 | B2 * | 3/2014 | Meier | G01M 3/2807 |
| | | | | 137/460 |
| 8,763,635 | B2 * | 7/2014 | Erdmann | B60K 15/03519 |
| | | | | 137/197 |
| 2005/0133095 | A1 * | 6/2005 | Nogle | F16K 1/14 |
| | | | | 137/533.11 |
| 2007/0215217 | A1 * | 9/2007 | Goodhope | F16K 15/04 |
| | | | | 137/512.1 |
| 2008/0099084 | A1 * | 5/2008 | Headley | F04B 43/0736 |
| | | | | 137/533.15 |
| 2012/0048401 | A1 * | 3/2012 | Yamashita | F16K 15/04 |
| | | | | 137/528 |
| 2012/0061184 | A1 * | 3/2012 | Craft | F04C 2/102 |
| | | | | 184/6.12 |

\* cited by examiner

CONTROL VALVE UNIT

CROSS-REFERENCE TO RELATED APPLICATION

This application is based upon and claims the benefit of priority from Japanese Patent Application No. 2016-200247 filed on Oct. 11, 2016, the content of which is incorporated herein by reference.

BACKGROUND OF THE INVENTION

Field of the Invention

This invention relates to a control valve unit configured to control oil flow to an automatic transmission.

Description of the Related Art

Conventionally, there is a known control valve unit of this type, in which a check valve mechanism is incorporated in the control valve unit. For example, Japanese Unexamined Utility Model Publication No. 63-094348 (JPS63-094348U) describes a control valve unit having a pair of bodies, a separator plate interposed between the pair of bodies, and a plug fitted into an opening of the separator plate. The plug is provided with a valve port and a valve seat, and the valve port is open and closed by applying hydraulic force to contact and separate a check ball with and from the valve seat.

However, owing to the plug being fitted into the opening of the separator plate in the control valve unit described in JPS63-094348U, cracking, deformation or the like is apt to occur at the fitted portions of the separator plate and the plug. A control valve unit that optimally incorporates a check valve mechanism without risk of incurring cracking, deformation and the like is therefore desirable.

SUMMARY OF THE INVENTION

An aspect of the present invention is a control valve unit including: a first valve body configured to form a first fluid channel; a second valve body configured to form a second fluid channel; a separator plate interposed between the first valve body and the second valve body and provided with an opening; a collar attached to the separator plate through the opening, the collar including a valve port communicating the first fluid channel and the second fluid channel and a valve seat provided at an end of the valve port on a side of the second fluid channel; a check ball disposed in the second fluid channel to open and close the valve port by being separated from the valve seat and seated on the valve seat by a hydraulic pressure; and a combining part configured to combine the first valve body and the second valve body to sandwich the collar between an end surface of the first valve body or the second valve body and an end surface of the separator plate.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 4. The control valve unit according to the embodiment of the present invention is installed in a vehicle and used to control flow of oil (hydraulic oil, lubricating oil, coolant oil, etc.) to multiple hydraulic devices constituting components of an automatic transmission.

Figure 1:
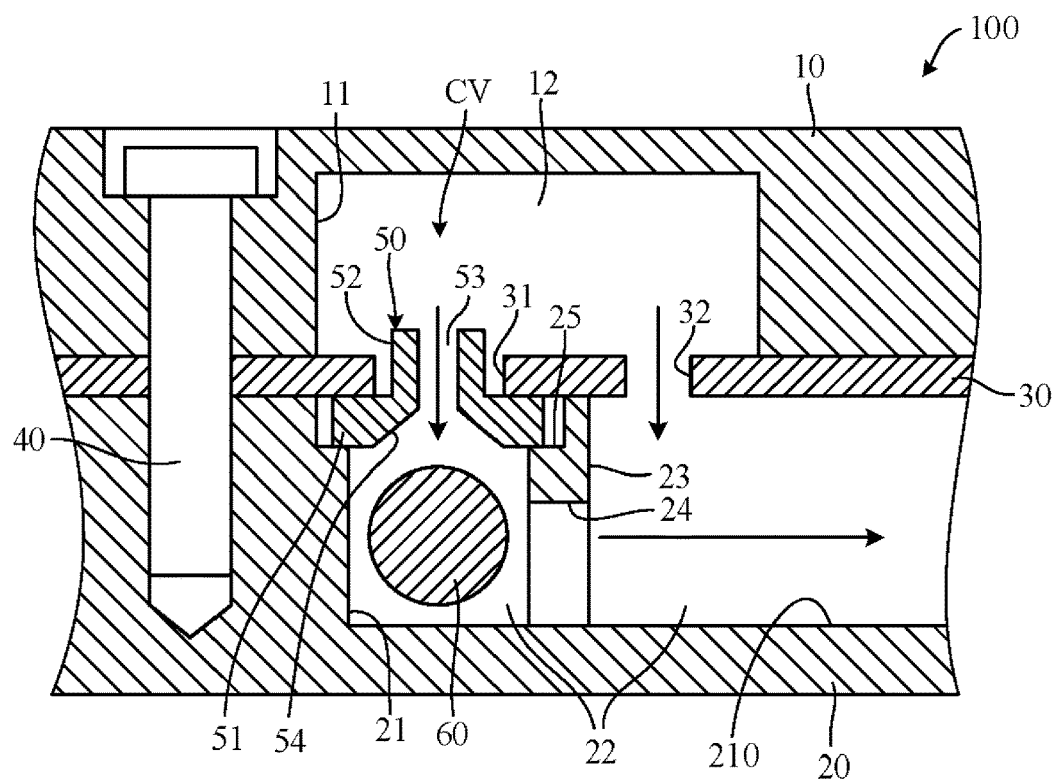
FIG. 1 is a cross-sectional diagram showing schematically main components of a control valve unit according to an embodiment of the present invention.

FIG. 1 is a cross-sectional diagram showing schematically main components of a control valve unit 100 according to the embodiment of the present invention. This control valve unit 100 is, for example, mounted under an automatic transmission case installed in a vehicle. As shown in FIG. 1, the control valve unit 100 includes an upper valve body 10, a lower valve body 20, and a separator plate 30 interposed between the upper valve body 10 and lower valve body 20. The upper valve body 10 and lower valve body 20 are fastened by bolts 40 (only one shown) passed through the upper valve body 10 and separator plate 30 and screwed into threaded holes (only one shown) of the lower valve body 20, whereby the separator plate 30 is sandwiched between the valve bodies 10 and 20. Although not illustrated in the drawings, abutting regions are sealed by applying seal material or the like at places where the upper valve body 10 and the lower valve body 20 make contact with the separator plate 30. Alternatively, it is possible to omit the seal material at the abutting regions and sandwich the separator plate 30 between the upper valve body 10 and lower valve body 20 without interposing seal material.

A groove 11 formed on an undersurface of the upper valve body 10 forms an upper fluid channel 12. Grooves 21, 210 formed on an upper surface of the lower valve body 20 form a lower fluid channel 22. A particular feature here is that, as shown in FIG. 1, a partition 23 is provided to stand between the grooves 21 and 210, and the lower fluid channel 22 is formed to pass through an opening 24 provided in the partition 23. Openings 31 and 32 are formed to vertically pass through the separator plate 30, and the upper fluid channel 12 and lower fluid channel 22 communicate through the openings 31 and 32.

The control valve unit 100 incorporates a check valve mechanism CV for enabling or disabling communication between the upper fluid channel 12 and lower fluid channel 22 via the opening 31. The check valve mechanism CV includes a collar 50 disposed in the opening 31 and a spherical check ball 60 movably disposed in the groove 21 (the lower fluid channel 22) under the collar 50. The groove 21 is formed so that cross sectional surface in a horizontal direction is substantially rectangular shape or substantially circular shape.

The collar 50 includes a plate portion 51 of predetermined thickness with substantially circular outer shape and a tubular portion 52 rising from the middle of the plate portion 51 with substantially cylindrical shape. Outer diameter of the tubular portion 52 is smaller than diameter of the substantially circular opening 31. A valve port 53 is formed to pass through the tubular portion 52 and the plate portion 51 at a center region of the tubular portion 52. A tapered valve seat 54 is formed completely around an edge of the valve port 53 on the side of the plate portion 51. Diameter of the valve port 53 is smaller than diameter of the check ball 60. The diameter of the valve port 53 is suitably defined in accordance with required flow rate of oil through the valve port 53.

An upper surface of the lower valve body 20 is formed around the groove 21 with a substantially circular recess 25 of predetermined depth. The depth of the recess 25 is substantially equal to thickness of the plate portion 51 of the collar 50, and inner diameter of the recess 25 is larger than outer diameter of the plate portion 51. Therefore, as illustrated, the plate portion 51 can be accommodated in the recess 25 to be sandwiched between the lower valve body 20 and the separator plate 30. In this state, the tubular portion 52 is inserted into the opening 31 with its entire circumference spaced in radial direction across a gap from the inner peripheral surface of the opening 31. The radial direction gap between the tubular portion 52 and the opening 31 is larger than a radial direction gap between the plate portion 51 and the recess 25.

Figure 2:
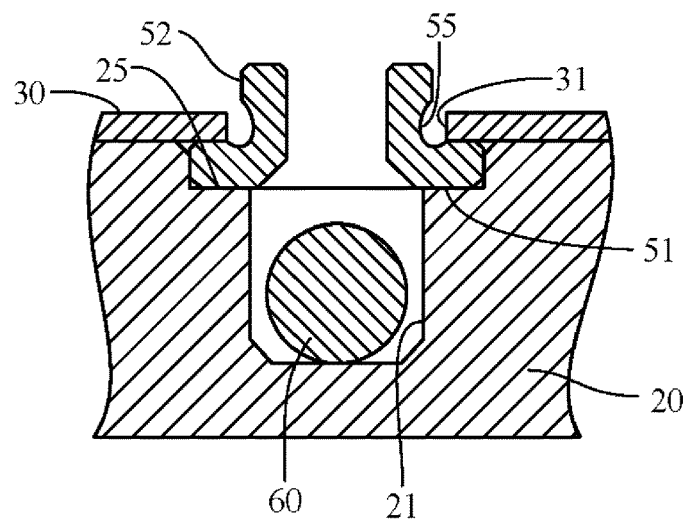
FIG. 2 is an enlarged view showing a main part of a check valve mechanism included in the control valve unit according to the embodiment of the present invention in detail.
Figure 3:
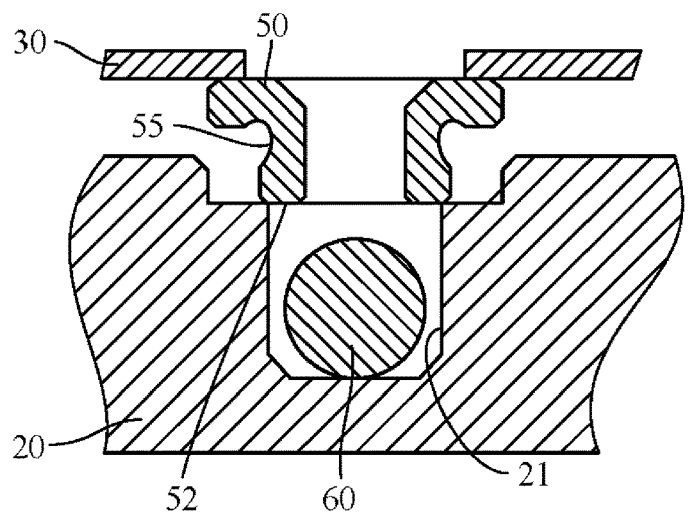
FIG. 3 is a figure showing a condition where the collar is arranged on an opposite side of FIG. 1.

FIG. 2 is an enlarged view showing a main part of the check valve mechanism CV in detail. As shown in FIG. 2, the tubular portion 52 has a neck 55 at its outside lower end (connection with the plate portion 51), and the neck 55 is positioned to face the inner peripheral surface of the opening 31. Outer diameter of the tubular portion 52 is larger than width (or inner diameter) of the groove 21 of the lower valve body 20. Therefore, when the collar 50 is turned upside down, as shown in FIG. 3, the tubular portion 52 cannot enter the groove 21, and a large gap SP arises between the separator plate 30 and the top surface of the lower valve body 20. As a result, inverted installation of the collar 50 becomes obvious, so that establishment of an adequate radial direction gap between the tubular portion 52 and opening 31 is ensured, without risk of installing the collar 50 in the wrong direction.

The control valve unit 100 is assembled as follows. First the check ball 60 is placed in the groove 21 of the lower valve body 20. Next, the plate portion 51 of the collar 50 is set in the recess 25 in the top surface of the lower valve body 20. Next, the separator plate 30 is mounted on the top surface of the lower valve body 20. At this time, the tubular portion 52 of the collar 50 comes to protrude from the opening 31 of the separator plate 30. Next, the upper valve body 10 is mounted on the upper surface of the separator plate 30. Finally, the upper valve body 10, separator plate 30 and lower valve body 20 are integrally fastened by the bolts 40.

In the above control valve unit 100, when oil supplied to the upper fluid channel 12 causes pressure in the upper fluid channel 12 to exceed pressure in the lower fluid channel 22, the check ball 60 is pushed downward by hydraulic pressure, as shown in FIG. 1. The check ball 60 therefore separates from the valve seat 54 to open the valve port 53. As a result, oil flows from the upper fluid channel 12 through the valve port 53 into the lower fluid channel 22, as indicated by an arrow in FIG. 1.

Figure 4:
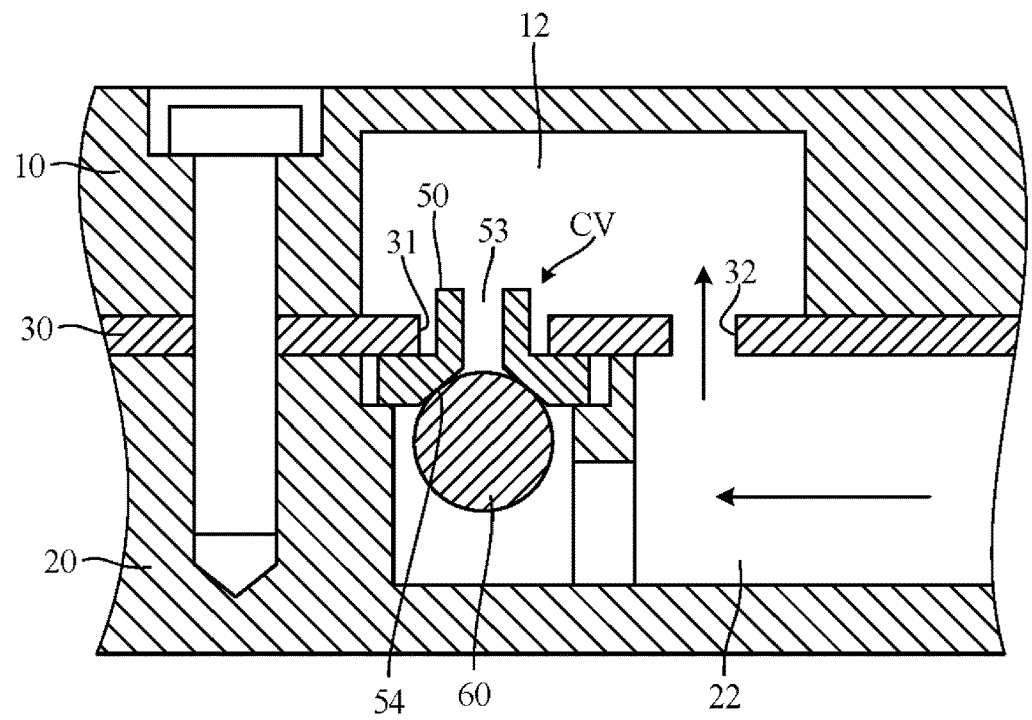
FIG. 4 is a figure showing an example of an operation of the control valve unit according to the embodiment of the present invention.

On the other hand, when oil supplied to the lower fluid channel 22 causes pressure in the lower fluid channel 22 to exceed pressure in the upper fluid channel 12, the check ball 60 is pushed upward toward the valve seat 54 by hydraulic pressure, as shown in FIG. 4. The check ball 60 therefore seats on the valve seat 54 to close the valve port 53. As a result, oil flow from the lower fluid channel 22 through the valve port 53 to the upper fluid channel 12 is blocked.

In the configuration shown in FIGS. 1 and 4, an opening 32 is provided in the separator plate 30 separately of the opening 31 to which the check valve mechanism CV is applied, so that oil can constantly flow through the opening 32 from the upper fluid channel 12 to the lower fluid channel 22 or from the lower fluid channel 22 to the upper fluid channel 12 irrespective of whether the check valve mechanism CV is open or closed. However, the opening 32 can be omitted. That is to say, a configuration can be adopted that communicates the upper fluid channel 12 and the lower fluid channel 22 solely through the check valve mechanism CV.

The present embodiment can achieve advantages and effects such as the following:

(1) The control valve unit 100 includes: the upper valve body 10 forming the upper fluid channel 12; the lower valve body 20 forming the lower fluid channel 22; the separator plate 30 having the openings 31 and 32 and interposed between the upper valve body 10 and lower valve body 20; the collar 50 attached to the separator plate 30 through the opening 31 and having the valve port 53 communicating the upper fluid channel 12 and lower fluid channel 22 and the valve seat 54 provided at the end of the valve port 53 on the side of the lower fluid channel 22; and the check ball 60 disposed in the lower fluid channel 22 and opening and closing the valve port 53 by being separated from the valve seat 54 and seated on the valve seat 54 by hydraulic pressure. The collar 50 is sandwiched between top surface of the lower valve body 20 and the bottom surface of the separator plate 30 (FIG. 1).

Since the sandwiching of the collar 50 between the top surface of the lower valve body 20 (more specifically, bottom surface of recess 25) and the bottom surface of the separator plate 30 in this way prevents excessive stress from acting on the attachment region when attaching the collar 50 to the separator plate 30 through the opening 31, cracking and deformation of, inter alia, the opening 31 of the separator plate 30 can be prevented. In other words, the check valve mechanism CV can be incorporated in the control valve unit 100 in an optimum mode, without producing excessive stress or the like in the opening 31 and so on. The collar 50 including the valve port 53 and valve seat 54 is provided independently, so that, in comparison with a case of, for example, directly abutting the check ball 60 on the separator plate 30, stress at time of contact with check ball 60 can be reduced and state of sealing by the check ball 60 can be stably maintained thanks to enhanced seating performance of the check ball 60. Moreover, flow rate of oil passing from the upper fluid channel 12 to the lower fluid channel 22 is easy to establish because it is determined by the diameter of the valve port 53.

(2) The collar 50 includes the tubular portion 52 passing through the opening 31 and the plate portion 51 contacting with the bottom surface of the separator plate 30 and the top surface of the lower valve body 20, and the tubular portion 52 is disposed across a gap from the inner peripheral surface of the opening 31 (FIG. 1). As a result, occurrence of excessive thermal stress can be prevented even in a case where, for example, the collar 50 and separator plate 30 are made of materials differing in coefficient of linear thermal expansion and a thermal expansion difference is present between them.

(3) The tubular portion 52 has the neck 55, which is formed to face the inner peripheral surface of the opening 31 (FIG. 2). Since the diameter of the tip of the tubular portion 52 can therefore be made larger than width the groove 21 of the lower valve body 20, inadvertent upside down installation of the collar 50 can be prevented (FIG. 3).

(4) The recess 25 is provided in the top surface of the lower valve body 20 facing the bottom surface of the separator plate 30, and the plate portion 51 is disposed in the recess 25 (FIG. 1). Assembly of the control valve unit 100 is therefore facilitated because the recess 25 can be used for positioning the collar 50.

In the above embodiment, the recess 25 for accommodating the plate portion 51 is provided at the top surface of the lower valve body 20. However, the recess for accommodating the plate portion can alternatively be provided in the bottom surface of the upper valve body 10. In such case, it suffices to insert the tubular portion 52 of the collar 50 in the opening 31 from above and provide the valve seat for seating the check ball 60 in the tip of the tubular portion 52. It is further possible to provide the recess in the top surface or bottom surface of the separator plate 30 instead of in the bottom surface of the upper valve body 10 or the top surface of the lower valve body 20. Also possible is to provide one recess in the bottom surface of the upper valve body 10 or the top surface of the lower valve body 20 and another recess in the top surface or bottom surface of the separator plate 30.

Although the separator plate 30 is interposed between the upper valve body 10 (first valve body) and the lower valve body 20 (second valve body), the separator plate can be alternatively disposed between a pair of left-right or front-rear valve bodies rather than between a pair of upper-lower valve bodies. Therefore, the fluid channels (first fluid channel; second fluid channel) formed in the pair of valve bodies are not limited to the upper fluid channel 12 and the lower fluid channel 22. Although the pair of valve bodies 10 and 20 are fastened by the bolts 40 in the above embodiment, a combining part for combining the pair of valve bodies and interposed separator plate together is not limited thereto.

The above embodiment can be combined as desired with one or more of the above modifications.

According to the present invention, a collar including a valve port and a valve seat is sandwiched between an end surface of a first valve body or a second valve body and an end surface of separator plate. Therefore, when the collar is attached to the separator plate through an opening, cracking and deformation at an opening of the separator plate, etc. can be prevented. As a result, a check valve mechanism can be incorporated in a control valve unit in an optimum mode.

Above, while the present invention has been described with reference to the preferred embodiments thereof, it will be understood, by those skilled in the art, that various changes and modifications may be made thereto without departing from the scope of the appended claims.

What is claimed is:
1. A control valve unit, comprising:
a first valve body configured to form a first fluid channel;
a second valve body configured to form a second fluid channel;
a separator plate contacting the first valve body and the second valve body to be interposed between the first valve body and the second valve body and provided with an opening;
a collar disposed through the opening, the collar including a valve port communicating the first fluid channel and the second fluid channel and a valve seat provided at an end of the valve port on a side of the second fluid channel;
a check ball disposed in the second fluid channel to open and close the valve port by being separated from the valve seat and seated on the valve seat by a hydraulic pressure; and
a combining part configured to combine the first valve body and the second valve body so that the collar contacts an end surface of the second valve body and an end surface of the separator plate to be sandwiched between the end surface of the second valve body and the end surface of the separator plate.
2. The control valve unit according to claim 1, wherein the collar includes a tubular portion configured to pass through the opening and a plate portion configured to contact the end surface of the second valve body and the end surface of the separator plate, and the tubular portion is disposed across a gap from an inner peripheral surface of the opening.
3. The control valve unit according to claim 2, wherein the tubular portion includes a neck formed to face the inner peripheral surface of the opening.
4. The control valve unit according to claim 2, wherein a recess is provided on the end surface of the second valve body facing the end surface of the separator plate, and the plate portion is disposed in the recess.
5. The control valve unit according to claim 4, wherein the combining part is a bolt passed through the first valve body and the separator plate and screwed into a threaded hole.
6. The control valve unit according to claim 1, wherein the opening is a first opening, and the separator plate is further provided with a second opening constantly communicating the first fluid channel and the second fluid channel.
7. The control valve unit according to claim 1, wherein the control valve unit is mounted on an automatic transmission case of a vehicle.

* * * * *